J. JASGOTT.
INSTRUMENT OF PRECISION.
APPLICATION FILED APR. 20, 1911.
1,022,849.
Patented Apr. 9, 1912.
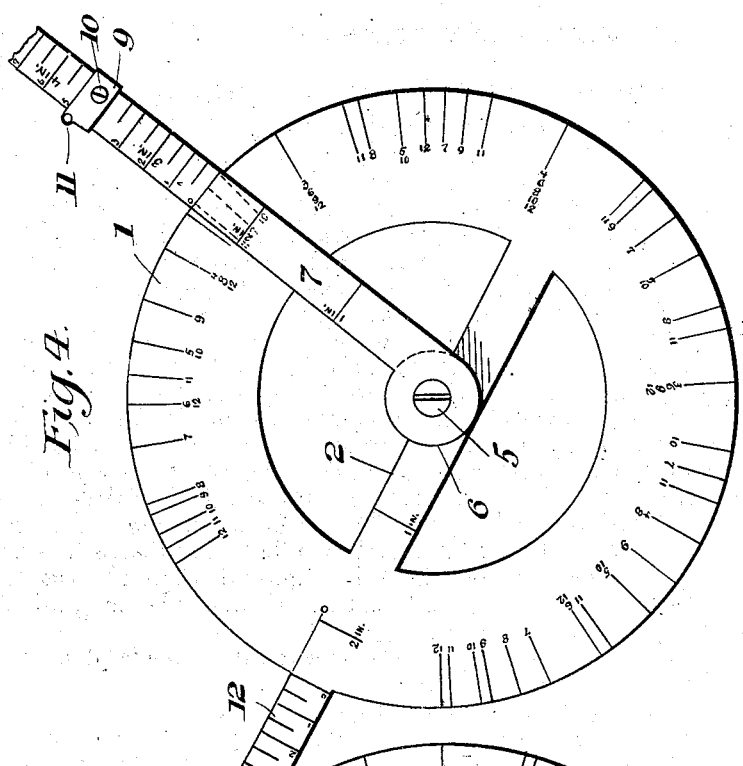
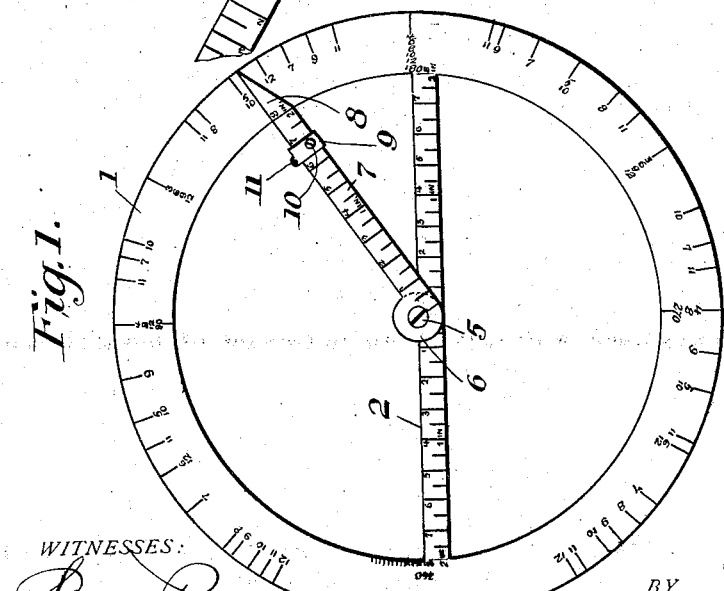
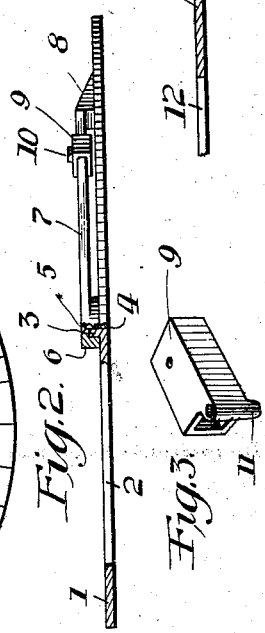
WITNESSES:
INVENTOR.
J. Jasgott.
BY
ATTORNEYS.

UNITED STATES PATENT OFFICE.

JOHN JASGOTT, OF CHRISTOPHER, ILLINOIS.

INSTRUMENT OF PRECISION.

1,022,849.   Specification of Letters Patent.   Patented Apr. 9, 1912.

Application filed April 20, 1911. Serial No. 622,253.

*To all whom it may concern:*

Be it known that I, JOHN JASGOTT, a subject of the Czar of Russia, residing at Christopher, in the county of Franklin and State of Illinois, have invented certain new and useful Improvements in Instruments of Precision, of which the following is a specification, reference being had therein to the accompanying drawing.

This invention relates to an instrument of precision, and the object of the invention is to provide an instrument that can be advantageously used by draftsmen, machinists and other artisans for laying off quadrants, segments, and arches and the instrument being somewhat similar to a protractor and can be used for the same purpose.

I attain the above object by a mechanical construction that will be hereinafter specifically described and then claimed, and reference will now be had to the drawing, wherein:—

Figure 1 is a plan of the instrument. Fig. 2 is a side elevation of the same partly broken away and partly in section. Fig. 3 is an enlarged perspective view of a detached slide. Fig. 4 is a plan of another form of instrument, and Fig. 5 is a longitudinal sectional view of the same.

The reference numeral 1 denotes a metallic flat ring having the inner walls thereof connected by a bar 2 and this bar intermediate the ends thereof is provided with a boss 3 having a vertical opening 4. Pivotally mounted upon the boss 3 and retained thereon by a set screw 5 is a head 6 of an arm 7, said arm having a pointer 8 extending over the ring 1. Slidably mounted upon the arm 7 is a slide 9 provided with a set screw 10 whereby it can be fixed relatively to the arm 7. The slide 9 has a vertical barrel 11 adapted to receive the point of a marking instrument, as a pencil. The upper surface of the bar 2 and the arm 7 are graduated whereby various measurements can be made. The inner edge of the outer face of the ring is provided with ordinary degree graduations, and the outer edge with a series of graduation marks of which the corresponding numbers refer, in each case, to the number of equal parts into which said marks divide a circle, starting always from the zero mark.

In Figs. 4 and 5 another instrument is shown especially designed for greater measurements. The arm 7 is prolonged and the outer edge of the ring 1 is provided with an extension 12 representing a continuation of the bar 2.

To use the device it is placed upon the material to be measured, the arm 7 is then adjusted to the proper angle, the marking instrument inserted in the barrel 11, the arm 7 is then moved to the desired graduation. The element 2 is used as a rule and the same is true of the arm 7. The device shown as Fig. 4 is used for measuring larger pieces of material than that when the device shown in Fig. 1 is employed. The element 12 is a continuation of the rule or graduated bar 2.

The instrument can be made of metal or celluloid.

What I claim is:—

1. An instrument of precision, comprising a flat graduated ring, a graduated bar connecting the opposite inner edges of said ring positioned centrally with respect to the ring, an extension carried by the outer edge of said ring and representing a continuation of said bar, a boss carried by said bar intermediate the ends thereof, a graduated arm pivotally mounted upon said boss and adapted to swing over said ring, a slide adjustably mounted upon said arm, and a barrel carried by said slide, substantially as described.

2. An instrument of precision comprising a flat graduated ring, a graduated bar connecting the opposite inner edges of said ring and positioned centrally with respect to the ring, a boss carried by said bar centrally thereof, a graduated arm pivotally mounted upon said boss and capable of swinging over said ring, a slide adjustably mounted upon said arm, and a barrel carried by said slide.

In testimony whereof I affix my signature in the presence of two witnesses.

JOHN JASGOTT.

Witnesses:
　WM. KISELL,
　W. PETROFF.